United States Patent Office 2,785,208
Patented Mar. 12, 1957

2,785,208

HYDROGENATION OF CONJUGATED TERPENES

Joseph P. Bain and Wilbur Y. Gary, Jacksonville, Fla., assignors to The Glidden Company, Cleveland, Ohio, a corporation of Ohio No Drawing. Application April 16, 1953,
Serial No. 349,312

14 Claims. (Cl. 260—666)

This invention relates to the preparation of menthenes by the selective hydrogenation of conjugate menthadienes, with or without isomerization of one or more of the selectively hydrogenated products. The invention also relates to a process for the purification of menthadiene mixtures by converting conjugated dienes therein to menthenes, and then fractionating the treated mixture for removal and recovery of the menthenes, which are valuable in the synthesis of menthols.

We have found that conjugated p-menthadienes including alpha terpinene, 2,4(8)-menthadiene, 2,4(5)-menthadiene, and 3,8(9)-menthadiene can be selectively hydrogenated individually, or in admixture with each other in the presence of non-conjugated p-menthadienes boiling nearby, to yield mixtures of p-menthenes in which 3-menthene predominates over 2-menthene or 4(8)-menthene. The 4(8)-menthene in the treated mass can be isomerized to 3-menthene by means of a heat treatment with an acid catalyst. Such hydrogenation, preferably followed by isomerization, in addition to providing 3-menthene in good yield, also makes it possible to purify non-conjugated p-menthadienes such as gamma terpinene or terpinolene by selectively hydrogenating the impure mass to convert the conjugated p-menthadienes therein to p-menthenes, and then by fractional distillation removing the p-menthenes to leave gamma terpinene and/or terpinolene of good purity.

Accordingly, it is an object of this invention to provide a novel process involving the selective hydrogenation of selected mixtures of conjugated p-menthadienes, with or without non-conjugated p-menthadienes to convert the conjugated p-menthadienes to p-menthenes and then the fractional distillation of the p-menthenes.

It is a further object of the invention to supplement the foregoing treatment with a catalytic isomerization treatment for converting 4(8)-p-menthene to 3-p-menthene.

Still another object is to employ the novel selective hydrogenation treatment to convert selected conjugated p-menthadienes contained in admixture with non-conjugated p-menthadienes into p-menthenes which can be removed by fractional distillation, thereby to effect isolation and purification of the non-conjugated p-menthadienes.

These and other ancillary objects will be apparent from the following description of the invention.

As pointed out above, we have found that conjugated p-menthadienes which have a double bond thereof involving the number four carbon atom (e. g., alpha terpinene, 2,4(8)-p-menthadiene, 3,8-p-menthadiene and 2,4(5)-p-menthadiene), can be selectively hydrogenated to p-menthenes. We have found that this result can be secured by employing any of the known and/or usual hydrogenation catalysts in small amounts. Nickel catalysts, however, are generally preferred because of their low cost, their tendency to give higher ratios of 3-menthene/2-menthene and their somewhat better selectivity. The catalytic hydrogenation can be effected under hydrogen pressures of 0 to 200 pounds per square inch gauge pressure at temperatures between about 25° C. and 50° C. In general, higher temperatures are required for hydrogenation with nickel. Higher temperatures, however, are to be avoided with catalysts such as palladium which readily cause disproportionation thus leading to cymene formation. With palladium and platinum therefore cooling of the hydrogenating mixture is appropriate to reduce cymene formation. The reaction is usually quite vigorous and is exothermic. When the conjugated menthadienes have been converted to menthenes, the rate of hydrogenation decreases and hydrogenation may cease when mild hydrogenation conditions are employed, thus providing a convenient indication of the hydrogenation end point. In other cases, observation of hydrogenation rate may not provide an adequate measure of control of the process so that it may be desirable to remove samples during hydrogenation and determine conjugate menthadiene disappearance and formation of menthenes, suitably by spectrophotometric analysis or by various simpler tests. Camphene and cymene are also unchanged, or are affected only slightly. The predominant product of the selective hydrogenation of the specified conjugated menthadienes is 3-p-menthene, but 2-p-menthene and 4(8)-p-menthene are also produced in minor amounts. The selectivity of the treatment makes it possible to treat numerous impure terpene mixtures so as to affect only the conjugated p-menthadienes therein.

The commercial catalytic isomerization of turpentine gives fractions which are complex mixtures containing mostly monocyclic conjugated and non-conjugated p-menthadienes and which are impossible to separate economically by fractional distillation. We have found that these fractions can be treated effectively by our hydrogenation method to convert conjugated p-menthadienes which involve a double bond at the number 4 carbon atom to p-menthenes, and that the latter can be effectively removed from the reaction mass by fractional distillation. Other similar mixtures amenable to like treatment are: acid-treated terpenes, such as by-products of terpineol or terpin hydrate manufacture, and by-products of polymerization processes. In general the pinenes, turpentine, citrus limonene, dipentene and terpinolene are capable of conversion to mixed monocyclic diene mixtures rich in conjugate p-dienes when they or their mixtures are contacted with mineral or strong organic acids, and earths and similar catalysts at temperatures of 50° C. to 175° C. All such mixtures contain the conjugated dienes 3,8-p-menthadiene and 2,4(8)-p-menthadiene which boil so close to terpinolene and gamma terpinene that it is difficult to separate the non-conjugated dienes in a state of purity. Selective hydrogenation, however, permits removal of the conjugated dienes by conversion to a much lower boiling product, e. g., 3-p-menthene. Gamma terpinene and terpinolene can then be separated in high purity for use in industry, thereby making it possible to recover these valuable materials from sources not heretofore recognized as being of much industrial value.

The following examples illustrate the principles of our invention and represent the best modes of practice presently known to us.

*Example 1*

A fraction representing a complex mixture of terpenes resulting from the catalytic isomerization of turpentine, and consisting principally of monocyclics and containing substantial amounts of conjugated terpenes of the p-menthadiene series can be hydrogenated at 0 to 20 pounds hydrogen pressure and at 25° C. to 150° C. in the presence of a hydrogenation catalyst such as nickel, palladium, platinum, etc. until the rate of absorption of hydrogen becomes noticeably slower. The treated mass can be fractionally distilled and the fractions analyzed spectrographically for their components. The following table (arranged in the order of boiling points at 100 millimeters pressure) provides a comparison between the starting materials and the treated products.

|  | B. P., 100 mm., °C. | Components of— | |
|---|---|---|---|
|  |  | Original Mass, Percent | Treated Mass, Percent |
| camphene | 92 | 0-10 | 0-10 |
| 3-p-menthene | 101 | 0-5 | 15-50 |
| 2-p-menthene | 101 | trace | 5-10 |
| trans-p-menthane | 103.5 | trace | trace |
| 2,4(5)-p-menthadiene | 105 | 0-5 | absent |
| alpha terpinene | 107 | 0-40 | absent |
| cis-p-menthane | 108 | trace | trace |
| dipentene | 110 | 0-20 | 0-20 |
| 1-p-menthene | 110 | trace | 0-10 |
| cymene | 110 | 0-10 | 0-10 |
| 4(8)-p-menthene | 110 | 0-5 | 5-10 |
| 3,8-p-menthadiene | about 115 | 0-15 | absent |
| gamma terpinene | 115.5 | 0-20 | 0-20 |
| 2,4(8)-p-menthadiene | about 119 | 0-35 | absent |
| terpinolene | about 119 | 0-30 | 0-30 |

The exact composition will vary within the limits indicated in the table, or even outside these limits depending on the nature and extent of the isomerization occurring in the starting material and separation procedures employed. Thus mild isomerization of turpentine first leads to a product containing substantial amounts of dipentene and terpinolene, which however tend further to isomerize to the conjugated terpenes of the p-menthadiene series; also cymene and p-menthenes begin to form as the isomerization is continued.

It is evident from the foregoing table that the conjugated dienes 2,4(5)-p-menthadiene, alpha terpinene, 3,8-p-menthadiene and 2,4(8)-p-menthadiene have been removed from the starting isomerization mixture by the selective hydrogenation treatment and that the treated mass is now a mixture rich in p-menthenes and containing substantially unchanged any non-conjugated p-menthadienes originally present, such as dipentene, gamma terpinene and terpinolene. It is apparent from the boiling points that the so-treated mass can be fractionated to recover the 2-p-menthene and 3-p-menthene as a mixture. Yields of up to 49% of 3-p-menthene have been secured on fractionation of hydrogenated turpentine isomerization mixtures. The lowest boiling fraction contains camphene if this compound was present in the starting material; then follows a fraction consisting almost wholly of 2-p-menthene and 3-p-menthene which in turn is followed by a crude fraction containing dipentene, cymene and 4,8-p-menthene; then cuts rich in gamma terpinene are secured, and finally terpinolene. The cut rich in 4,8-p-menthene can be heated with an acid isomerization catalyst such as acid clay, sulfuric acid, benzene sulfonic acid, etc., whereupon 3-p-menthene is formed by acid isomerization while dipentene is converted to such products as polymer and alpha terpinene. The cimene is unaffected by the acid catalyst. The materials boiling above trans-p-menthane can be recovered for use as a commercial solvent, can be disproportionated to cymene and p-menthane, acid isomerized to a mixture rich in conjugated dienes suitable for reprocessing or can be fractionated to recover gamma terpinene and terpinolene of high purity.

*Example 2*

Alpha terpinene, having the structure

has been found to be present in substantial amounts up to 40-50% in some turpentine isomerization mixtures. An alpha terpinene fraction freshly prepared from such a mixture was selectively hydrogenated to observe the effects produced. The treatment was carried out at 90-120° C. under 50-200 pounds hydrogen pressure in the presence of a commercial nickel catalyst until 0.93 mole of hydrogen per mole of alpha terpinene had been accepted. Spectrographic analysis of the hydrogenated product showed that the alpha terpinene had disappeared entirely and that the mixture contained 49% 3-p-menthene.

*Example 3*

426 grams of a fraction consisting of 90% 2,4(8)-p-menthadiene and boiling at about 119° C. at 100 mm. pressure was mixed with 1% of a commercial nickel catalyst and was charged into a 4.5 liter bomb. Hydrogen was introduced at a pressure of 300 pounds per square inch, the bomb was sealed, and the bomb and contents were agitated and heated. Hydrogenation began at 135° C. and 384 pounds pressure. At 143° C. the heat was shut off but the temperature continued to rise to 162° C. Hydrogenation required 30 minutes. 86% of the hydrogen theoretically required was used, assuming the starting material to be 100% menthadiene and the final product to be 100% menthene. The pressure was then raised back to 122 pounds of hydrogen, and the temperature was raised to 168° C. In 20 minutes only 4.6% more hydrogen was absorbed, which was at such a slow rate that the hydrogenation to a single double bond molecule was assumed to be complete.

Infrared spectroanalysis of the hydrogenated material indicated that the material contained about 50% 3-p-menthene, 20% 2-p-menthene, and 25% 4(8)-p-menthene. There were also traces of p-cymene, 1-p-menthene and 8-p-menthene which apparently came from impurities originally present in the 2,4(8)-p-menthadiene.

A sample of the hydrogenated material was refluxed for seven hours with 2M H₂SO₄ to isomerize the 4(8)-p-menthene to 3-p-menthene, and the isomerization mixture was then fractionated to recover 3-p-menthene.

*Example 4*

A fraction of terpenes produced by isomerization of pinene with an acidic catalyst and possessing the following approximate composition:

| | Percent |
|---|---|
| α-Terpinene | 7 |
| dl-Limonene | 23 |
| Gamma terpinene | 19 |
| 3,8(9)-menthadiene | 2 |
| Terpinolene | 24 |
| 2,4(8)-menthadiene | 24 | was hydrogenated at 100-150 pounds/inch² pressure using 0.75% of a commercial nickel catalyst containing about 25% nickel and 2.5% copper suspended in oil. The temperature at the beginning of the hydrogenation was 80° C., and was raised gradually to 150° C. Hydrogen absorption became very slow after 0.7 mole of hydrogen per mole of terpene was absorbed. The reaction was stopped and from infrared and distillation data, the product was found to contain approximately:

| | Percent |
|---|---|
| 2-p-menthene | 6 |
| 3-p-menthene | 44 |
| Limonene | 10 |
| 4(8)-p-menthene | 4 |
| Cymene | 5 |
| Gamma terpinene | 12 |
| Terpinolene | 15 |

This hydrogenated mixture was fractionated in a column packed with protruded stainless steel packing (0.24 x 0.24″), thirteen feet high operating at a reflux ratio of about twenty-five to one. After removal of the lower boiling menthenes, limonene and cymene, a fraction rich in gamma terpinene was isolated and another that was nearl pure terpinolene was obtained. These were refractionated in a column of the same type operating at about forty to one in reflux ratio, and the fractions examined spectrographically. The best terpinolene fraction appeared to be without impurities, and the best gamma terpinene was more than 99% pure. The properties of these very pure materials are shown below.

|  | Gamma Terpinene | Terpinolene |
| --- | --- | --- |
| $n_D^{25}$ | 1.4765 | 1.4866 |
| Specific Gravity | $d_4^{27.1}=0.8443$ | $d_4^{25.3}=0.8544$ |
| $\Delta d/t°$ C | -.0007 | -.0007 |
| Molar Refraction | 45.47 | 45.80 |
| Boiling Point, °C/10 mm | 63 | 67 |

A control fractionation of the starting mixture of conjugate and non-conjugate terpenes showed it to be impossible to separate good quality gamma terpinene and terpinolene free of the conjugated menthadienes which boil so nearby, prior to the selective hydrogenation.

*Example 5*

A mixture of monocyclic terpenes consisting of 25% α-terpinene, 25% gamma terpinene, 25% terpinolene and 25% 2,4(8)-p-menthadiene was hydrogenated selectively using 173 grams of the terpene mixture, 0.635 gram platinum oxide and 30–60 pounds/inch² hydrogen pressure. Samples were withdrawn periodically and after filtering off the catalyst, they were examined by infrared analysis.

When one quarter mole of hydrogen had been absorbed per mole of terpene mixture, the product was shown to contain less than half the original α-terpinene content, about half the original 2,4(8)-p-menthadiene content and about the same quantities of gamma terpinene and terpinolene as were present initially. 3-p-Menthene and a considerable quantity of 2-p-menthene were formed; only a trace of cymene was formed presumably by disproportionation induced by the catalyst in presence of the heat generated by the hydrogenation.

A sample taken when 63.9 mole percent of hydrogen was absorbed per mole of terpene was found to contain no α-terpinene, no 2,4(8)-p-menthadiene and only about half as much terpinolene and gamma terpinene as was present in the starting material. Less than 10% cymene was formed due to disproportionation. Considerable amounts of 2-p-menthene, 1-p-menthene and 3-p-menthene were present.

*Example 6*

A mixture of monocyclic terpenes consisting of 25% α-terpinene, 25% gamma terpinene, 25% terpinolene and 25% 2,4(8)-p-menthadiene was hydrogenated selectively and stepwise using 173 grams of the terpene mixture, 0.635 gram palladium catalyst (5% Pd on carbon) and hydrogen pressure of 30 to 60 pounds/inch². Small samples of the selectively hydrogenated product were withdrawn at intervals during hydrogenation and their infrared spectra were obtained. These spectra were analyzed by the usual methods by comparison with spectra of the known pure terpenes and hydrogenated terpenes and their known mixtures. The analyses were not made completely quantitatively but were semi-quantitative.

(*a*) When hydrogen corresponding to 25% of that required for saturation of a single double bond had been absorbed, the product contained practically no 2,4(8)-p-menthadiene, a little less than 25% α-terpinene, a little cymene formed by disproportionation, most of the terpinolene originally present and the concentration of gamma terpinene was about the same as in the unhydrogenated mixture. Of the menthenes, more 2-p-menthene was present than 3-p-menthene.

(*b*) When hydrogen corresponding to 50% of that required for saturation of a single double bond had been absorbed, the product contained a little more cymene than (*a*), no α-terpinene, less 2-p-menthene and more 1-p-menthene and 3-p-menthene. Only a little terpinolene remained. Gamma terpinene was still present in almost 25% concentration.

(*c*) When hydrogen corresponding to that required for hydrogenation of 63% of a single double bond had been absorbed, no terpinolene remained and there was less than half as much 2-p-menthene present as was present in the mixture produced in section (*a*) above when only 25% of the hydrogen corresponding to a single double bond had been absorbed. Cymene content remained constant as compared to the (*b*) stage above. Appreciably more 3-p-menthene and 1-p-menthene was present. About 10 to 15% of the gamma terpinene originally present had now disappeared.

*Example 7*

A sample consisting of about 70% 2,4(8)-p-menthadiene 10% terpinolene, 15% gamma terpinene and 5% 3,8-p-menthadiene was hydrogenated with nickel catalyst until practically no conjugated material remained as was shown by ultraviolet spectroanalysis. The product was fractionated into three fractions, the first contained about 70% 3-p-menthene and 25% 2-p-menthene, and boiled over the range 100° C. to 106° C. at 100 mm. The second fraction boiled over the range 106° C. to 112° C. and consisted of about 85% 4(8)-p-menthene and small quantities of cymene and 1-p-menthene. The third fraction boiled over the range 112° C. to 120° C. and consisted of terpinolene and gamma terpinene. The second fraction rich in 4(8)-p-menthene was heated for 4 hours at reflux with 40% aqueous sulfuric acid. The organic layer was then separated, washed with water and fractionated to yield fractions of 3-p-menthene of about 95% purity and boiling sharply at 101° C. and practically free of 2-p-menthene. These fractions amounted to about 65% of the product taken for isomerization. Higher boiling fractions of this series consisted of mixtures of unreacted 4(8)-p-menthene, cymene and 1-p-menthene.

*Example 8*

Samples of citrus limonene, turpentine and steam distilled dipentene were hydrogenated with sufficient hydrogen to correspond to 50% of a single double bond per mole. There was produced no 3-p-menthene except from the steam distilled dipentene and here only about 3% of 3-p-menthene could be detected in the hydrogenation product.

Samples of the citrus limonene, turpentine and steam distilled dipentene were than contacted with 25% aqueous sulfuric acid for eight hours at the boiling point of the mixture. The reaction products were then separated and fractionated to obtain crude fractions boiling over the range 105° C. to 120° C. at 100 mm. On selective hydrogenation with sufficient hydrogen to correspond to 50% of a double bond per mole the products now contained about 20% to 30% 3-p-menthene, traces of 2-p-menthene and conjugated dienes. The products were fractionated individually, and mixtures rich in the non-conjugated terpenes, terpinolene and gamma terpinene were isolated from the higher boiling fractions in each case.

From the foregoing examples and description of the invention, it will be evident that the invention is especially useful in treating complex mixtures of terpenes, thereby to convert selected conjugated p-menthadienes therein to p-menthenes and to prepare a new mixture of terpenes more amenable to the recovery of various components therefrom. The invention is particularly useful in this way to prepare gamma terpinene and terpinolene of high purity. One novel aspect of the invention is the discovery that 2,4(8)-p-menthadiene can be selectively hydrogenated to p-menthene.

It is also to be noted that while various catalysts may be employed and each causes selective hydrogenation, within the meaning of the use of this term as employed therein, each catalyst provides slightly different and characteristic effects and that somewhat different hydrogenation conditions may be advantageously employed depending on the nature of the catalyst. Thus, in general, we prefer to hydrogenate under higher temperatures and pressures with nickel catalyst than with the noble metal catalysts. Further, the proportion of the hydrogenation products vary somewhat with the nature of the catalyst so that nickel may be preferred where highest ratios of 3-p-menthene to 2-p-menthene are desired and where a minimum amount of cymene is to be produced by disproportionation. It will be appreciated that the noble catalysts are however fully operable and that their use leads to attainment of our objectives.

Having now described our invention, what we claim is:

1. The process for recovering 3-p-menthene from a mixture rich in the conjugated monocyclic terpenes resulting from catalytic isomerization of turpentine and containing conjugated menthadienes having a double bond which involves the number 4 carbon, which comprises: hydrogenating the mixture under substantially non-disproportionating conditions until the said number 4 carbon conjugated menthadienes have been converted largely to menthenes; thereafter subjecting the treated mixture to fractional distillation and recovering a fraction rich in 3-p-menthene.

2. The process for recovering 3-p-menthene from a mixture which results from catalytic isomerization of turpentine and which is rich in conjugated monocyclic terpenes having a double bond involving the number 4 carbon atom, which comprises: hydrogenating the mixture under substantially non-disproportionating conditions until the said number 4 carbon conjugated monocyclic terpenes have been converted largely to menthenes; heating the so-hydrogenated product with an acidic isomerization catalyst; and thereafter subjecting the treated mixture to fractional distillation and recovering a fraction rich in 3-p-menthene.

3. The process for recovering gamma terpinene, which comprises: hydrogenating under substantially non-disproportionating conditions a mixture of monocyclic terpenes containing gamma terpinene and conjugated monocyclic terpenes of the p-menthadiene series which have a double bond therein involving the number four carbon atom, stopping the hydrogenation when the said number 4 carbon conjugated terpenes therein have been converted largely to p-menthenes, and fractionally distilling the resulting hydrogenation mixture to recover gamma terpinene therefrom.

4. The process for recovering terpinolene, which comprises: hydrogenating under substantially non-disproportionating conditions a mixture of monocyclic terpenes containing terpinolene and conjugated monocyclic terpenes of the p-menthadiene series which have a double bond therein involving the number four carbon atom; stopping the hydrogenation when the said conjugated terpenes therein have been converted largely to p-menthenes, and fractionally distilling the resulting hydrogenation mixture to recover terpinolene therefrom.

5. The process for recovering 3-p-menthene comprising: providing a fraction of monocyclic terpenes which (a) are rich in conjugated terpenes of the p-menthadiene series, (b) contain conjugated menthadienes which involve the number 4 carbon atom and (c) are derived by catalytic isomerization of a material selected from the class consisting of turpentine, dipentene, and mixtures thereof; hydrogenating said provided fraction under substantially non-disproportionating conditions; stopping the hydrogenation when the said number 4 carbon conjugated terpenes have decreased substantially in amount; and fractionally distilling the resulting hydrogenation mixtures to separate therefrom a fraction enriched in 3-menthene.

6. The process for recovering a mixture rich in 2-p-menthene and 3-p-menthene, comprising: providing a fraction of monocyclic terpenes which have been derived by catalytic isomerization of a material selected from the class consisting of turpentine, dipentene, and mixtures thereof and which are rich in the conjugated terpenes of the p-menthadiene series which have a double bond involving the number 4 carbon; hydrogenating said provided fraction under substantially non-disproportionating conditions until the said number 4 carbon conjugated terpenes have decreased substantially in amount; and fractionally distilling the resulting hydrogenation mixture to separate therefrom a fraction rich in 2-p-menthene and 3-p-menthene.

7. The process for recovering 3-p-menthene which comprises: providing a mixture of terpenes boiling within the range 105° C. to 120° C. at 100 mm. derived from the catalytic isomerization of material selected from the class consisting of alpha pinene, beta pinene, dipentene, terpinolene, and mixtures thereof and which are rich in the conjugated terpenes of the p-menthadiene series which have a double bond involving the number 4 carbon atom; hydrogenating the provided mixture under substantially non-disproportionating conditions until the said number 4 carbon conjugated terpenes have been converted substantially to p-menthenes whereby the resulting mass is a mixture rich in p-menthenes and non-conjugated terpenes of the p-menthadiene series, and thereafter fractionally distilling the resulting hydrogenated mixture to recover therefrom a fraction rich in 3-p-menthene.

8. The process for recovering non-conjugated p-menthadienes from a mixture composed mainly of conjugated and non-conjugated p-menthadienes, which comprises: hydrogenating said mixture under substantially non-disproportionating conditions until the conjugated p-menthadienes which have a double bond involving the number 4 carbon have been eliminated by their conversion to more saturated compounds; and fractionally distilling the resulting hydrogenated mass to recover the non-conjugated p-menthadienes therefrom.

9. The process which comprises: hydrogenating under substantially non-disproportionating conditions a mixture containing (a) at least one conjugated p-menthadiene in which one double bond thereof involves the number four carbon atom, and (b) at least one non-conjugated p-menthadiene in which a cyclic double bond thereof involves the number one carbon atom, until the mixture is substantially free of conjugated p-menthadiene having a double bond which involves the number 4 carbon atom.

10. The process as claimed in claim 9 which includes the further step of fractionally distilling the resulting hydrogenated mixture to recover fractions rich in p-menthenes.

11. The process which comprises: hydrogenating 2,4-(8)-menthadiene under pressure and under substantially non-disproportionating conditions at an initial temperature of about 135° C. and thereafter allowing the temperature to rise to between 143° C. and 168° C. by the heat of the reaction, until a mixture of menthenes having substantial amounts of 3-p-menthenes and lesser amounts of 4(8)-p-menthene has been produced, then stopping the hydrogenation and fractionally distilling the mixture to recover fractions enriched in 3-p-menthene.

12. The process as claimed in claim 11 which includes the further step of fractionally distilling the mixture of p-menthenes to recover a fraction enriched in 4(8)-p-menthene.

13. The process as claimed in claim 11 which includes the further step of fractionally distilling the mixture of p-menthenes to recover a fraction enriched in 4(8)-p-menthene; heating said recovered fraction with acidic isomerization catalyst to convert the 4(8)-p-menthene therein to 3-p-menthene; and fractionally distilling the resulting isomerizate to recover 3-p-menthene substantially free of 2-p-menthene.

14. The process as claimed in claim 11 wherein the hydrogenation is stopped when the mixture contains about 50% 3-p-menthene, about 25% 4(8)-p-menthene and about 20% 2-p-menthene.

References Cited in the file of this patent

UNITED STATES PATENTS

| | | |
|---|---|---|
| 1,879,767 | Schoeller et al. | Sept. 27, 1932 |
| 1,921,138 | Schoeller et al. | Aug. 8, 1933 |
| 2,211,432 | Palmer et al. | Aug. 13, 1940 |
| 2,402,493 | Greensfelder et al. | June 18, 1946 |
| 2,526,895 | Pines et al. | Oct. 24, 1950 |

OTHER REFERENCES

Chemical Abstracts, vol. 26, page 1601[5] (1932).